Figure 1:
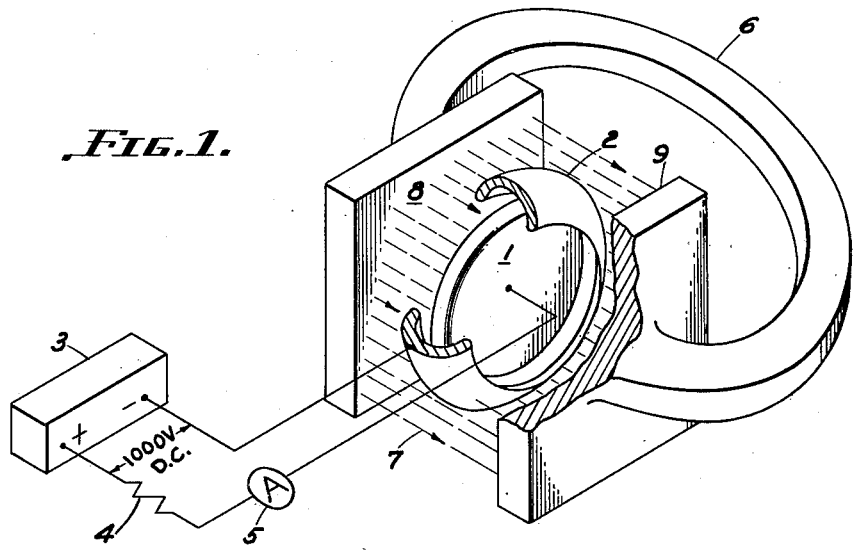

Dec. 4, 1951     W. A. ARNOLD     2,577,066

PRESSURE MEASURING DEVICE

Filed May 9, 1947

INVENTOR.
William A. Arnold
BY
Robert A Lavender
Attorney

Patented Dec. 4, 1951

2,577,066

UNITED STATES PATENT OFFICE 2,577,066

PRESSURE MEASURING DEVICE

William A. Arnold, Oak Ridge, Tenn., assignor, by mesne assignments, to the United States of America as represented by the United States Atomic Energy Commission Application May 9, 1947, Serial No. 746,954

9 Claims. (Cl. 175—183)

This invention relates generally to a pressure measuring device of the oscillation or electric discharge type utilizing crossed electric and magnetic fields. It is more particularly related to improvements in such devices involving novel electrode geometries resulting in an increased pressure range of useful operation.

The ordinary commercially available pressure gauge of this type is known as the Phillips gauge, and it is described in an article entitled, "High Vacuum Gauges" appearing in Phillips Technical Review 21:201–8, 1937, and also in U. S. Patent No. 2,197,079, entitled Method and Device for Measuring Pressures, issued April 16, 1945, in the name of F. M. Penning. This conventional oscillation type gauge consists essentially of two spaced parallel plates serving as cathodes and a wire loop therebetween serving as the anode, these electrodes being disposed in a magnetic field perpendicular to the plates and parallel to the axis of the wire loop. When a voltage of perhaps a thousand volts is applied to the electrodes of this device, the resultant oscillation of electrons between the electrodes produces, by ionization, an electric discharge, the intensity of which is a measure of the pressure of the medium in which the device is operating within the useful pressure range of the device. An ammeter placed in the external circuit provides an indication of this pressure.

It has been found that the Phillips gauge has an upper limit, or maximum cut-off value, of pressure which is given in the Phillips publication as one micron. In practice, even this value is somewhat difficult to attain since at values of about one-half microns the device often becomes extremely erratic and unreliable in performance.

In the device of the present invention, the particular electrodes of the Phillips gauge have been replaced by an annular anode and an annular cathode, annularly spaced from one another, such that an electric discharge region of arcuate cross section is defined by the intervening annular space between the electrodes. It has been found that by utilizing the novel electrode geometries of the present invention, the upper pressure limit of reliable operation of the device is increased to a value of perhaps 20 microns.

Accordingly, it is an object of the present invention to provide an oscillation type pressure gauge having an increased pressure range of useful operation.

It is another object of the present invention to provide an oscillation type pressure gauge which is reliable and accurate up to a pressure value of the order of 20 microns.

It is still another object of the present invention to provide an oscillation type pressure gauge wherein the electric discharge region is limited by the electrode geometries to a substantially confined annular space having an arcuate cross section.

Other objects and advantages of the present invention will become apparent from the following description when taken in connection with the accompanying drawings.

Figure 2:
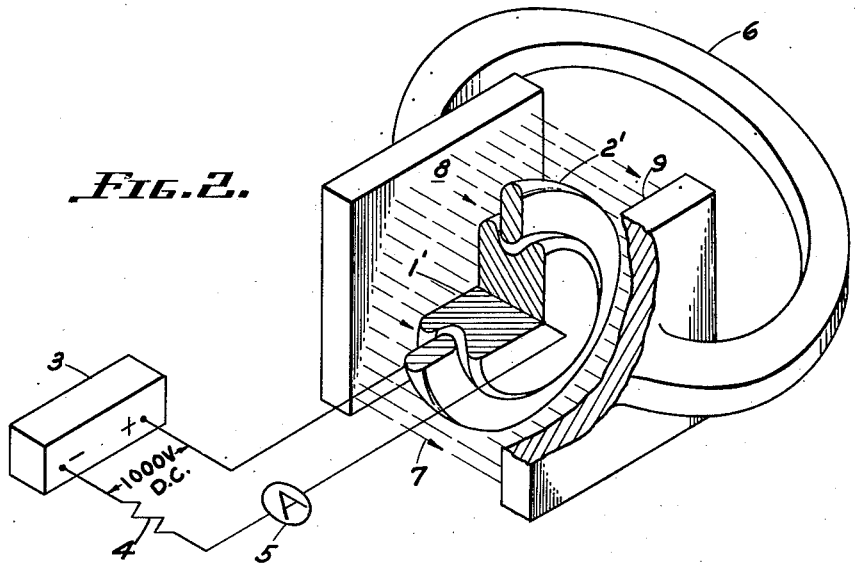

In the drawings,

Figure 1 is a perspective view illustrating one form of the present invention, and Figure 2 is a perspective view illustrating another form of the present invention.

Referring now to Figure 1, a disc-shaped anode 1 is located within a cylindrical cathode 2, this cathode having the shape of a cylinder of revolution formed by rotating an arcuate or C-shaped element about an axis spaced from the open end of the C. A power source, schematically indicated at 3, supplies a direct voltage of the order of one thousand volts to the electrodes, the positive side of the power supply being connected to the anode 1 through a resistor 4 and an ammeter 5, and the negative side of the power supply being connected to the cathode 2. A permanent magnet 6 provides a substantially uniform magnetic field, indicated by the arrow 7, between the pole pieces 8 and 9 of the magnet. Thus, by virtue of the particular geometries of the electrodes, an electric discharge region is provided between adjacent surfaces of the electrodes, said electric discharge region being annular in form and having an arcuate or C-shaped cross section, and being substantially confined as regards motion along the magnetic field 7, as may be seen by looking in that direction.

The principle of operation of the device is identical with that of the ordinary Phillips gauge. All points within the electric discharge region, except those lying exactly on the plane of symmetry through the electrodes and perpendicular to the magnetic field, are subjected to an electric field having one component parallel to the magnetic field and another component perpendicular to the magnetic field. Due to the component of electric field parallel to the magnetic field, electrons are directed toward the aforesaid plane of symmetry of the electrodes. They reach this plane at a high velocity and then proceed on past this plane until they reach a point on the opposite side thereof which is at the same potential as their point of origin. The same action then takes place in the opposite direction, and, as a result, the electrons oscillate back and forth between equi-potential points on opposite sides of the plane of symmetry.

At the same time, and due to the component of electric field perpendicular to the magnetic field, the electrons are caused to progress in a circumferential direction around the closed annular path defined by the electric discharge region. In this manner, the electrons are maintained in oscillation for a long period of time before finally being deposited upon an electrode surface, and, as a result, they strike and ionize a sufficient number of atoms of the medium gas to establish a glow discharge. Of course, the number of atoms of medium gas ionized depends upon the number present, that is, upon the pressure of the gas. Accordingly, the extent of the electric discharge within the confined region is a measure of the pressure of the medium gas and this pressure may be read directly upon a suitably calibrated ammeter 5 in the external circuit.

In Figure 2 there is shown an alternate form of the apparatus of Figure 1 which differs in the shape or geometry of the electrodes which are employed. In this case the cathode I' comprises a disc-like member having an annular groove extending circumferentially around its periphery. Thus, the outer surface of cathode I' may be thought of as generated by rotation of an arcuate or C-shaped element about an axis spaced from the closed end of the C. The anode 2', in this case, constitutes a ring-shaped member surrounding and spaced from the cathode I' so as to embrace the circumferential groove therein. In all respects other than the particular electrode geometries, the apparatus of Figure 2 is identical to that of Figure 1.

The operation of the form of the invention shown in Figure 2 is identical with that described with respect to Figure 1. However, this form of the invention has the advantage that the interelectrode electric discharge region is more accessible to the outside gas pressure, thus, increasing pump-out speed and providing a truer indication of outside pressure.

The theoretical reason for the improved operation of an oscillation type pressure gauge constructed according to the principles of the present invention is not fully understood. It is thought that the more stable electric discharge which exists in the present device may be accounted for by the fact that the electric discharge region is substantially confined with respect to motion along the magnetic field, or possibly by the fact that the zero electric field point existing at the center of the loop in the conventional Phillips gauge is eliminated, or by a combination of both of these reasons.

It will be clearly understood that the overall geometries of the electrodes of Figures 1 and 2 are not critical, the important consideration being that the adjacent surfaces of the electrodes be shaped so as to provide an interelectrode discharge region of an annular form and having an arcuate cross section. For example, it will be apparent that anode I of Figure 1 and cathode I' of Figure 2 could equally well be made hollow, that is, ring-shaped, rather than solid without changing the form of the electric discharge region. Also, as is clearly brought out in the literature relative to this type of ion gauge, the devices of the present invention would operate satisfactorily with an alternating voltage supply rather than a direct voltage supply as shown.

Since many changes in the above construction, and many apparently widely different embodiments of the invention could be made without departing from the scope thereof, it is intended that all matter contained in the above description, or shown in the accompanying drawings, shall be interpreted as illustrative and not in a limiting sense.

What is claimed is:

1. Electric discharge apparatus for measuring low pressures comprising means for producing a region of magnetic flux, a pair of concentric annular electrodes annularly spaced from one another and disposed within said field such that the axis thereof is substantially parallel to said field, a periphery of one of said electrodes embracing the adjacent periphery of the other of said electrodes to define a substantially confined electric discharge region therebetween having an arcuate cross section, and an external circuit connecting said electrodes, said circuit including a voltage source and a meter for measuring the current flowing in said circuit.

2. Apparatus as claimed in claim 1, wherein said arcuate shaped section of said electric discharge region faces radially inwardly.

3. Apparatus, as claimed in claim 1, wherein said arcuate section of said electric discharge region faces radially inwardly.

4. Apparatus, as claimed in claim 1, wherein the inner of said electrodes is formed as a disc, and the outer of said electrodes is formed as a ring having an inner surface of arcuate cross section mating with, but spaced with respect to, the outer periphery of said disc.

5. Apparatus, as claimed in claim 1, wherein the inner of said electrodes is formed as a disc having a circumferential groove therein of arcuate cross section, and the outer of said electrodes is formed as a ring mating with but spaced with respect to said groove.

6. Electric discharge apparatus for measuring low pressures comprising means for producing a region of magnetic flux, an electrode system disposed within said field and including an anode and a cathode, said electrodes being shaped and relatively disposed so as to define a substantially confined electric discharge region having a shape formed by rotating an arcuate element about an axis parallel to said field, and an external circuit connecting said electrodes, said circuit including a voltage source and a meter for measuring the current flowing in said circuit.

7. Apparatus, as claimed in claim 6, wherein the open side of said arcuate element is bounded by an anode surface, and the closed side of said element is bounded by a cathode surface.

8. Apparatus, as claimed in claim 6, wherein the axis of rotation of said arcuate element lies on the open side thereof.

9. Apparatus, claimed in claim 6, wherein the axis of rotation of said arcuate element lies on the closed side thereof.

WILLIAM A. ARNOLD.

REFERENCES CITED

The following references are of record in the file of this patent:

UNITED STATES PATENTS

| Number | Name | Date |
|---|---|---|
| 1,616,812 | Lilienfeld | Feb. 8, 1927 |
| 2,197,079 | Penning | Apr. 16, 1940 |

OTHER REFERENCES

Review of Scientific Instruments, vol. 17, No. 4, April 1946, pages 125–129, article by Picard et al.